United States Patent [19]

Cheung

[11] Patent Number: 4,694,483
[45] Date of Patent: Sep. 15, 1987

[54] COMPUTERIZED SYSTEM FOR ROUTING INCOMING TELEPHONE CALLS TO A PLURALITY OF AGENT POSITIONS

[75] Inventor: Edward H. Cheung, Mississauga, Canada

[73] Assignee: Innings Telecom Inc., Ontario, Canada

[21] Appl. No.: 869,408

[22] Filed: Jun. 2, 1986

[51] Int. Cl.⁴ .............................................. H04M 3/22
[52] U.S. Cl. ...................................... 379/34; 379/112; 379/164; 379/165; 379/265
[58] Field of Search ................... 379/34, 45, 157, 164, 379/165, 210, 213, 214, 218, 263-267, 308, 309, 113, 112

[56] References Cited

U.S. PATENT DOCUMENTS

| 4,066,847 | 1/1978 | Giordano | 379/82 |
| 4,408,100 | 10/1983 | Pritz et al. | 379/67 |
| 4,451,705 | 5/1984 | Burke et al. | 379/211 |

OTHER PUBLICATIONS

French, D. J., "London Telecommunications, The City Business System", *British Telecommunications Eng.*, vol. 2, Oct. 1983, pp. 174–178.

*Primary Examiner*—Gene Z. Rubinson
*Assistant Examiner*—Mark E. Ham
*Attorney, Agent, or Firm*—Bell, Seltzer, Park & Gibson

[57] ABSTRACT

A telephone call routing system for routing incoming telephone calls assigns each such incoming call to a selected one or more of a plurality of agent display modules. The agent display module has a visual output indicating which of a plurality of telephone lines carries the incoming call assigned to it. Any one of a plurality of agents' telephones associated with corresponding agents' modules may be connected to the line carrying the incoming call. Each telephone has a device for generating and transmitting a coded signal along the telephone line which is answered by that particular telephone. The signal is uniquely coded to identify the agent's module which is associated with the telephone which answers the incoming call. A signal detection device detects the transmitted coded signal and decodes the signal to determine which telephone associated with an agent's module answered the incoming call. A monitoring device monitors the agent telephone activity by determining and storing a characteristic representative of activity of each agent's telephone. The assignment of the next incoming call to one of more of the agents' modules is then determined by the extent of activity of each of the agents' telephones.

13 Claims, 15 Drawing Figures

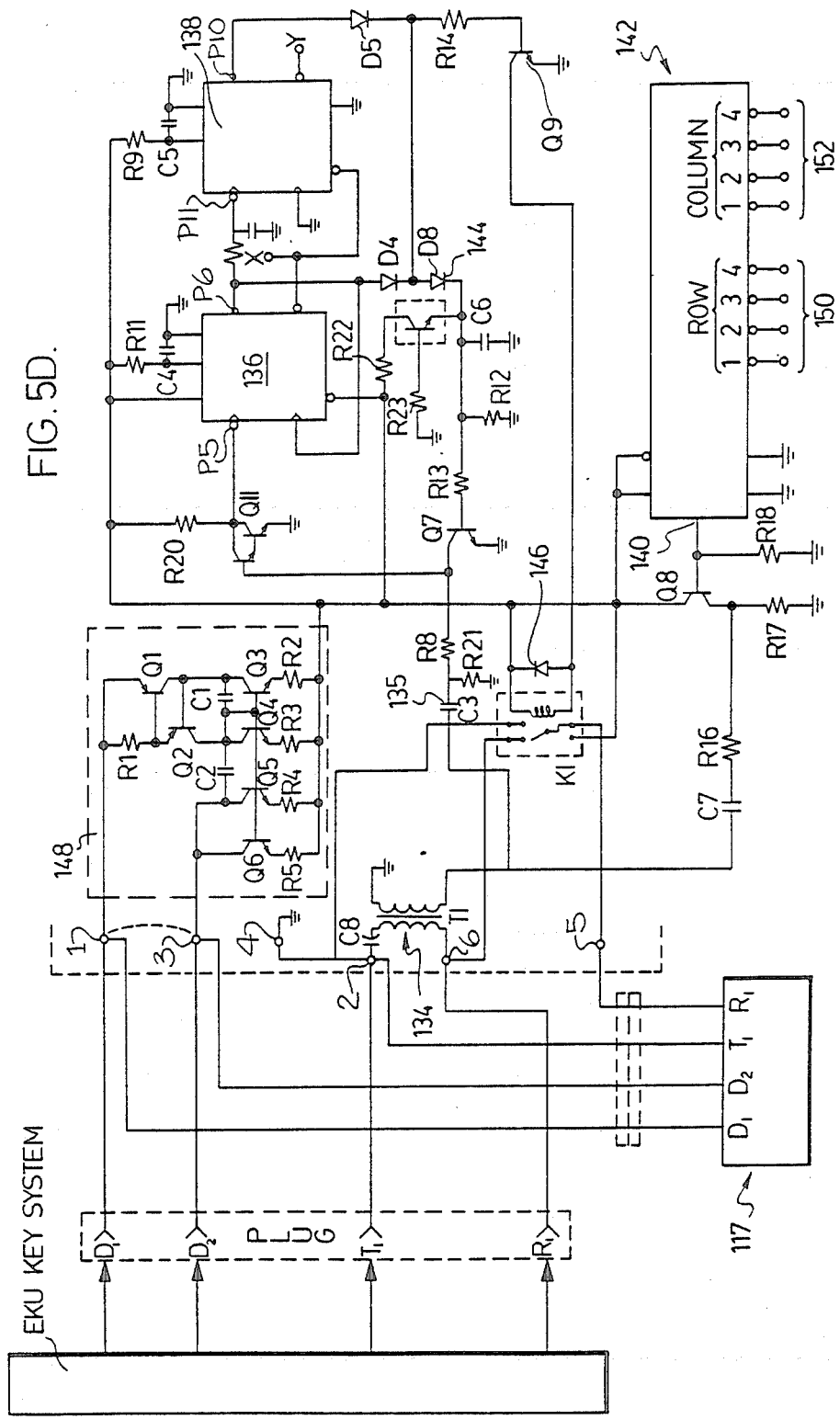

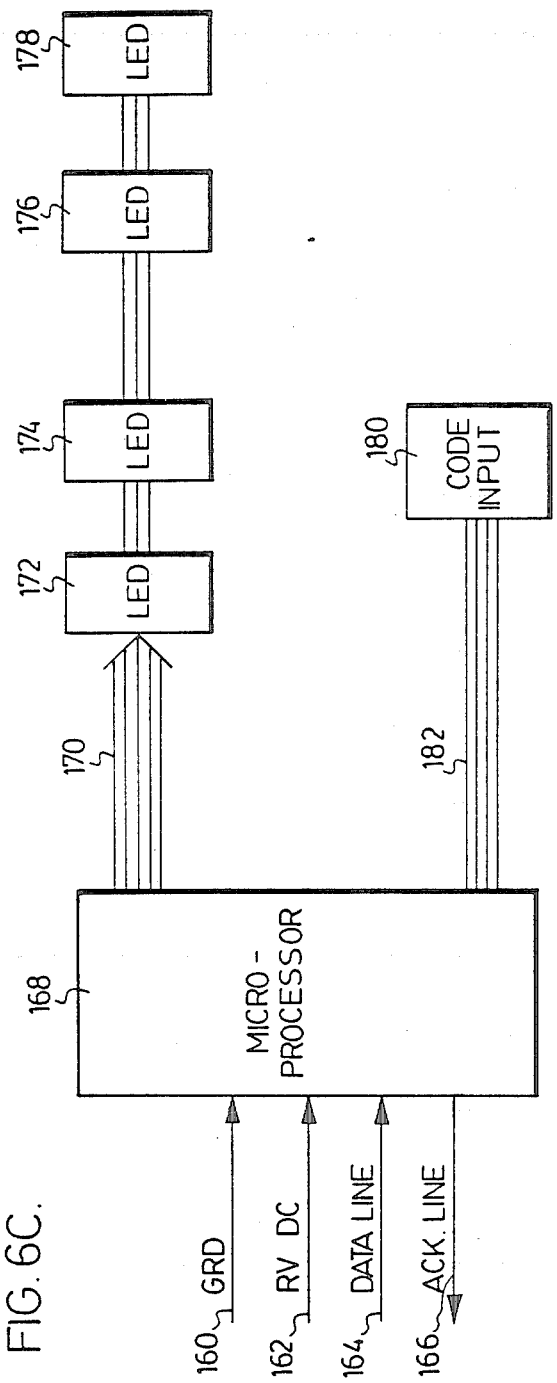

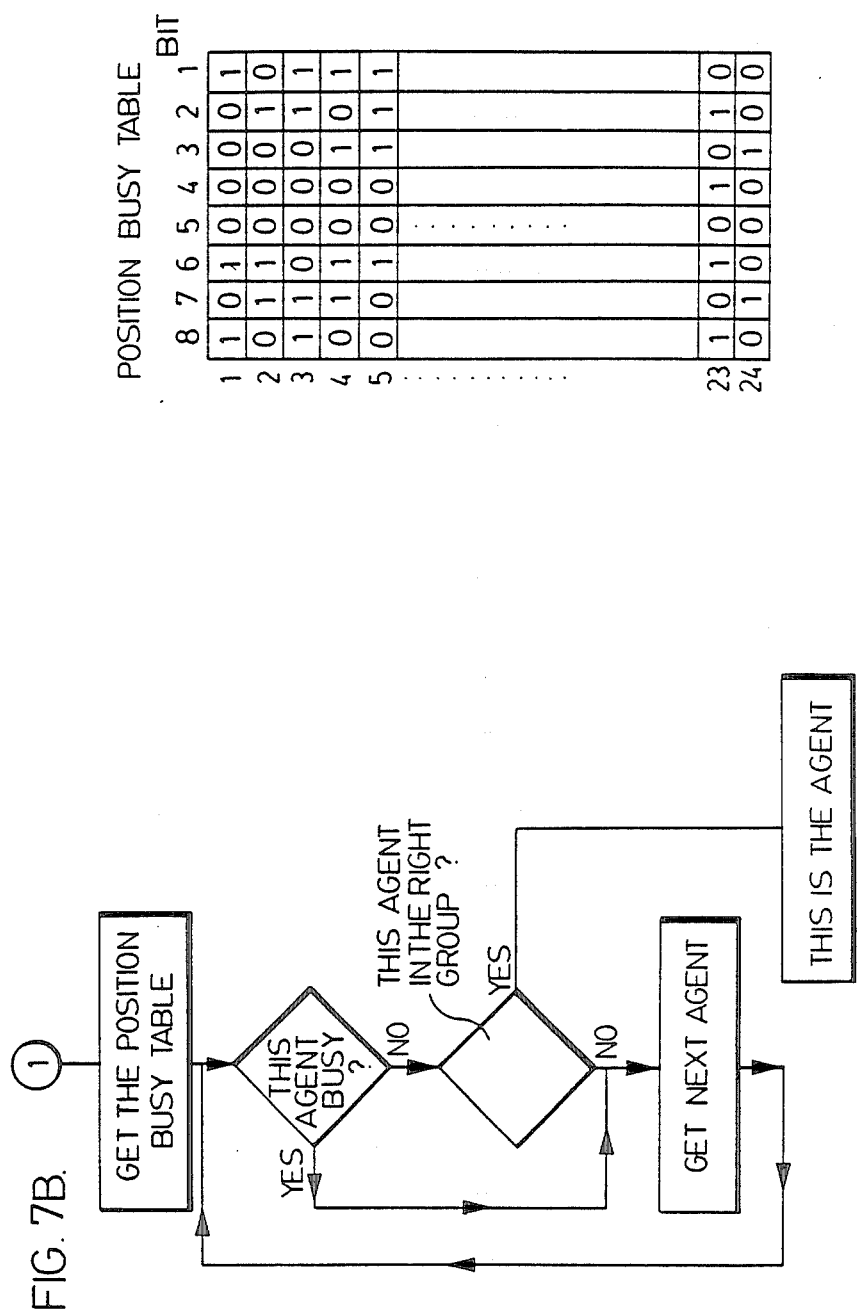

COMPUTERIZED SYSTEM FOR ROUTING INCOMING TELEPHONE CALLS TO A PLURALITY OF AGENT POSITIONS

FIELD OF THE INVENTION

This invention relates to a system for routing incoming telephone calls to a selected one of a plurality of agents' positions.

BACKGROUND OF THE INVENTION

There are basically two commonly known systems for routing incoming calls to one or more of a plurality of agents' positions. An automatic call sequencer having limited capability is used for routing calls normally in telephone systems having anywhere up to twenty-four incoming telephone lines. A far more complex, more versatile and relatively far more expensive system for routing telephone calls is the automatic call distributor system which can handle usually in the range of 100 to 200 hundred incoming telephone lines. A call sequencer performs some of the basic functions of an automatic call distributor. However, it does not normally have a capacity to track the activity of individual agents and provide for effective assigning of incoming calls to the agents to ensure an essentially equal distribution of the work load.

U.S. Pat. No. 4,451,705 discloses a known type of automatic call distributor system. This system includes the particular feature of providing an identification code uniquely associated with a particular user of the system. Such code is entered by the agent when the agent connects to the system, normally by dialing in its code. The automatic call distribution system is able to identify the agent at a particular station to which an agent has connected. As noted, however, with such automatic call distribution systems, they are very costly and are usually only economically viable when used with incoming lines of fifty or greater.

A modified type of call distribution system, as disclosed in U.S. Pat. No. 4,408,100, attempts to equally distribute incoming telephone calls among a plurality of agents-serviced positions in the key telephone system. The incoming calls are distributed to agents based on determining which of the available agent positions for answering an incoming call has had the longest ideal time since its last online condition. This system, however, is not capable of monitoring total time each agent has been busy during a work period, resulting an inequitable distribution of incoming telephone calls because it may be that the agent, which has had the longest delay period, is in actual fact the agent which has been the busiest during the overall work period.

SUMMARY OF THE INVENTION

According to an aspect of this invention, a telephone call routing system for routing incoming telephone calls assigns each such incoming call to a selected one of a plurality of agent display modules. The system comprises means for receiving the incoming telephone call and means assigns the incoming telephone calls to one or more of the agent display modules. Each of the agent display modules is in electronic communication with the incoming call assigning means. The agent display module has a visual output indicating which of a plurality of telephone lines carrying the incoming call is assigned thereto. A plurality of agents' telephones are provided. Each telephone is associated with a corresponding one of the agents' modules. Means connects each of the telephones to the line carrying the incoming call. The telephone has means for generating and transmitting a coded signal along the telephone line carrying the incoming call when any one of the telephones is actuated to answer the incoming call. The signal is uniquely coded to identify the agents' module which is associated with the telephone which answers the incoming call. Signal detection means detects the transmitted coded signal and decodes the signal and determines which telephone associated with an agent's module answered the incoming call. Means is provided for monitoring agent telephone activity by determining and storing a characteristic representative of activity of each agent's telephone. Means accesses the monitor means and determines activity of use of each telephone answering incoming calls. The accessing means is in communication with the assigning means. The assigning means assigns the next incoming call to the selected agent's module associated with the least actively used telephone providing there are at least two inactive telephones at the time of assigning the next incoming call.

According to another aspect of the invention, in a call routing system for routing incoming calls to a selected one of a plurality of agent positions, the system comprises a plurality of agent display modules and associated agents' telephones which constitutes an agent position. Each of the telephones is connectable to any one of a plurality of telephone lines. Means is provided for controlling routing of incoming calls. The controller means has means for assigning an incoming call to a selected one of the agent positions by displaying at a corresponding agent's module an incoming call line to be answered. Each of the agents' telephone comprises means for generating and transmitting on an answered incoming call line a coded signal unique to the agent's telephone which is actuated to answer the assigned incoming call line. The controller means has means for detecting and decoding the transmitted coded signal to determine which agent's telephone answered the assigned incoming call line.

BRIEF DESCRIPTION OF THE DRAWINGS

Preferred embodiments of the invention are discussed with respect to the drawings wherein:

FIG. 5D is a schematic of a portion of electronic circuitry of an electronic key telephone tone generation system;

FIG. 6C is a schematic of a portion of electronic circuitry for the agent's module;

FIGS. 7A and 7B are flow charts for the program routines which control distribution of incoming calls;

DETAILED DESCRIPTION OF THE PREFERRED EMBODIMENTS

Figure 1:
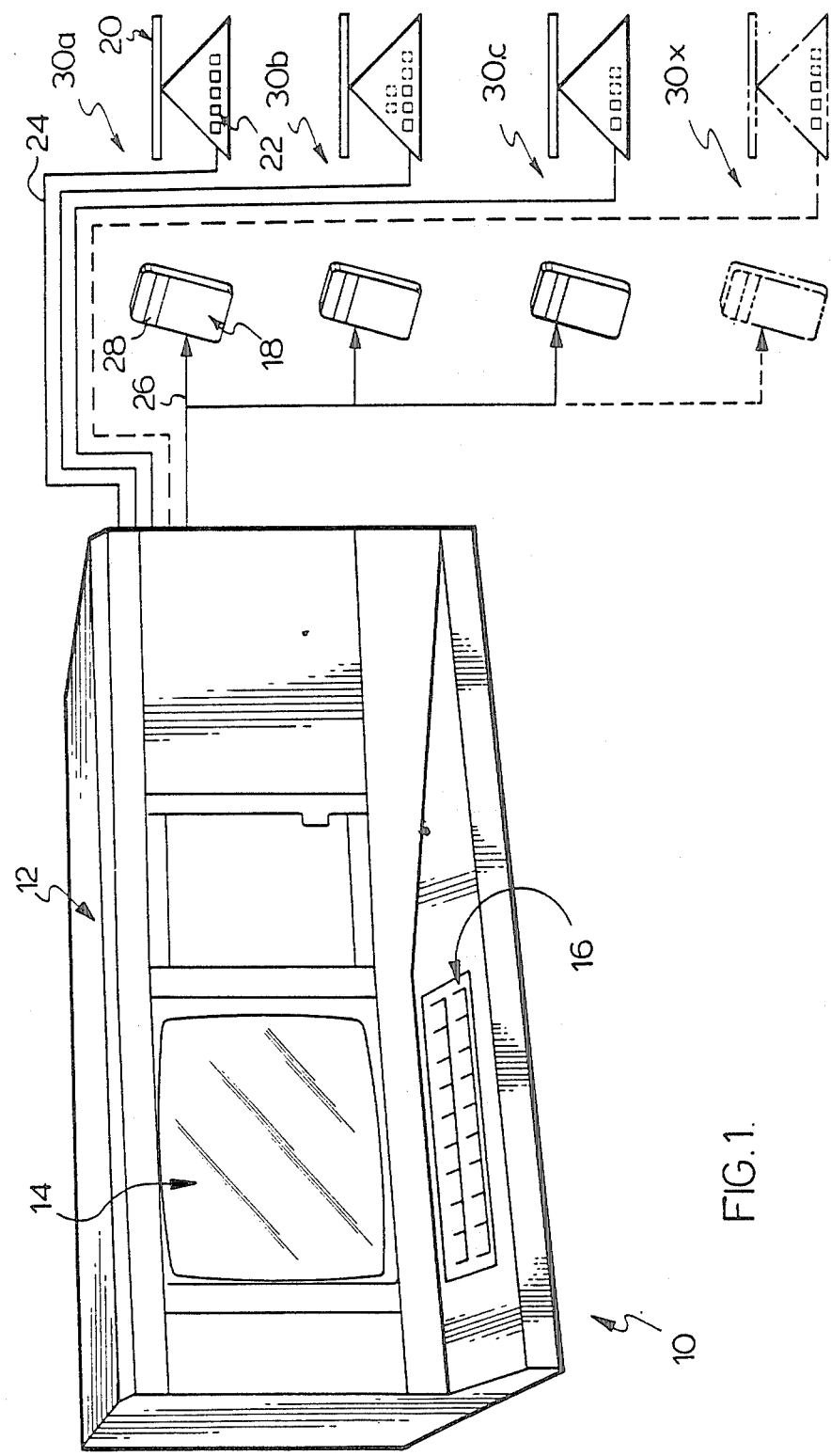
FIG. 1 is a perspective view of the call routing controller of this invention with associated agent modules and telephones.

The operator's station 10 for a preferred embodiment of the telephone call routing system of this invention is shown in FIG. 1. The interactive terminal of the operator's station is housed in a cabinet 12 having a CRT 14 for display of information and an operator interactive touch pad keyboard 16. Housed within the cabinet 12 are the necessary system components for receiving and routing incoming telephone calls. The incoming calls are routed to a plurality of agent positions. Each agent position comprises an agent's display module 18 and the associated telephone 20 has a plurality of buttons 22 for interconnection to an incoming call line. The incoming call lines are carried in each of the cables 24, a cable being provided for each of the telephones 20. Each display module 18 is connected to the routing system 10 via cable 26. Each display module has a visual display 28 which displays a line on which an incoming call has been assigned to that particular agent's position. The agent, at that position, then depresses the line button 22 to answer the assigned incoming call on the line shown on the display 28.

It is appreciated that with a plurality of agent positions, which are generally designated 30a, 30b through to 30x to represent a total of twenty-four agent positions and hence a potential of twenty-four incoming lines resulting in corresponding plurality of line buttons 22, that any one of the agents who might be free and has not been assigned a call may answer an incoming line indicated by a flashing button 22. The system, according to this invention, has the capability of monitoring this particular situation of agents answering calls not assigned to them in the manner to be discussed with respect to the details of this invention.

The system in exercising its control on routing incoming calls to one or more of a plurality of the agents' positions 30a through x monitors the activity of each of the agent positions and has the facility at any time to display on the CRT (cathode ray tube) 14 various information showing the status of all agents and the effectiveness of the system and the agents in handling incoming calls and placing outgoing calls. Such information can be called upon at any time by interaction of the operator with the keyboard 16 which includes a plurality of function keys for calling up a variety of desired information by way of following prompts on the CRT. In addition, various parameters may be programmed into the system in determining various times and actions to be taken and recordings of messages to be transmitted over incoming call lines when an incoming call is placed on hold. Examples of information available include the menu page which lists various pages of information for display on the CRT and optionally printed out on a printer. Such a menu may consist of several different pages of information and programming input. For example, line/position status may be displayed which gives the status of the lines and positions available and the user may change the status of any line or position while the system is in operation without disturbing any call already in progress. Another page of information may include the time, date, report and music and ring delay before calls are answered. Time and date can be readily entered by the keyboard. Music intervals and ring delay may be altered. Other key pad functions include a key which can designate the printing of whatever is displayed on the CRT screen. The night answer mode may be actuated by pressing an appropriate key. Further changes may be made from day/night modes by use the appropriate key.

Figure 2:
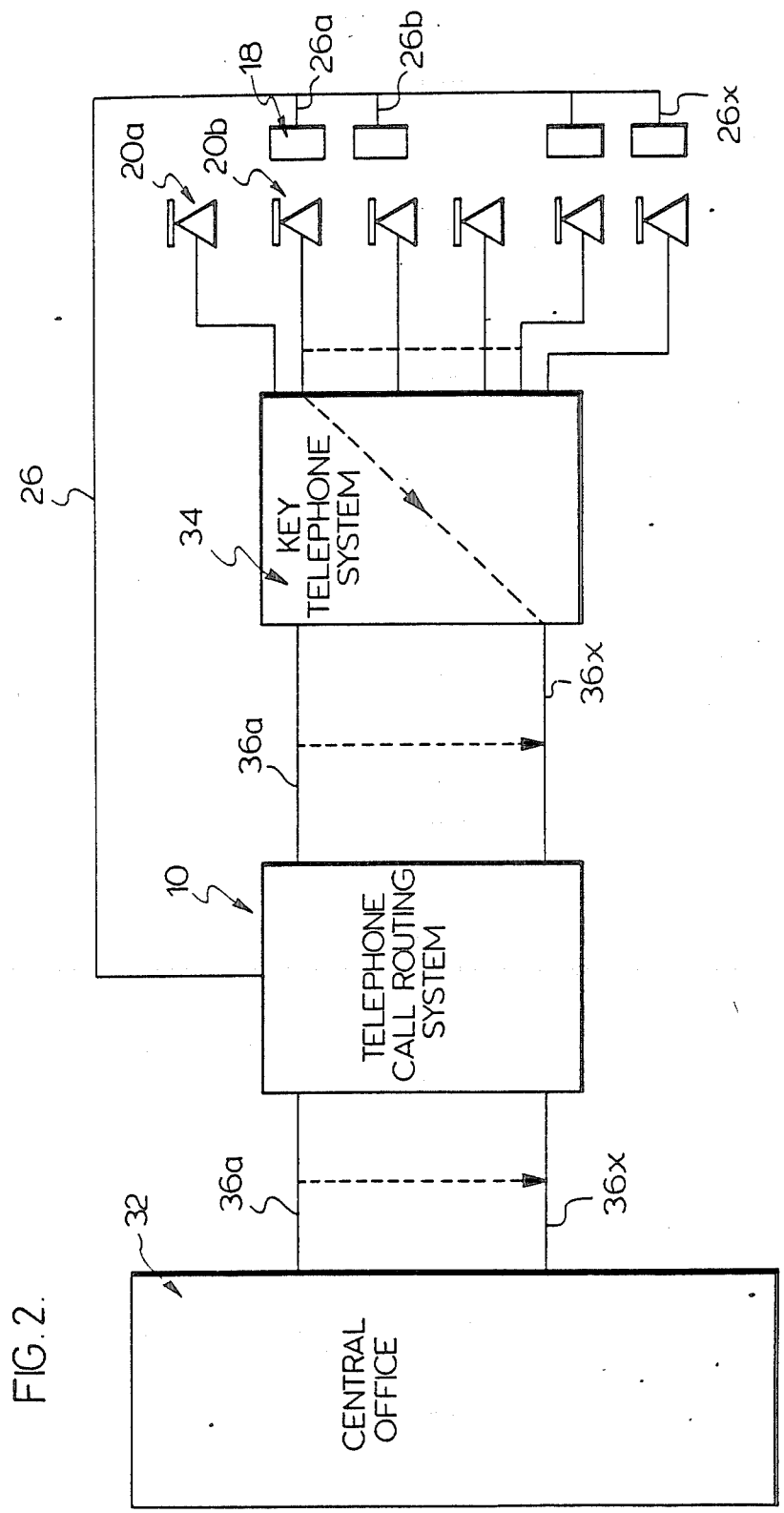
FIG. 2 is a block diagram schematically representing the interface of the call routing system with the incoming telephone line system.

With reference to FIG. 2, a block diagram indicates the relative positioning of incorporating the call routing system of FIG. 1 in a standard telephone system. As is normally provided in a telephone system, there is a central office 32 which directs calls to the key telephone system 34. The telephone call routing system is interposed between the central office and the key telephone system (KTS). The manner in which the call routing system is interposed between the central office and the KTS will be discussed with respect to FIG. 4. Such connection is accomplished without altering to any significant extent the telephone lines. The telephone call routing system 10, as discussed with respect to FIG. 1, is in communication with the agent modules 18 by way of the single cable 26 having branches at 26a, 26b through 26x for a twenty-four line telephone system. The key telephone system 34 functions in the normal manner when a particular telephone such as 20b is actuated to pick up an incoming line 36x. The incoming lines are designated 36a through 36x to indicate a twenty-four line system which may be in either discrete lines or on a cable and directed electronically to various agent positions.

Figure 3:
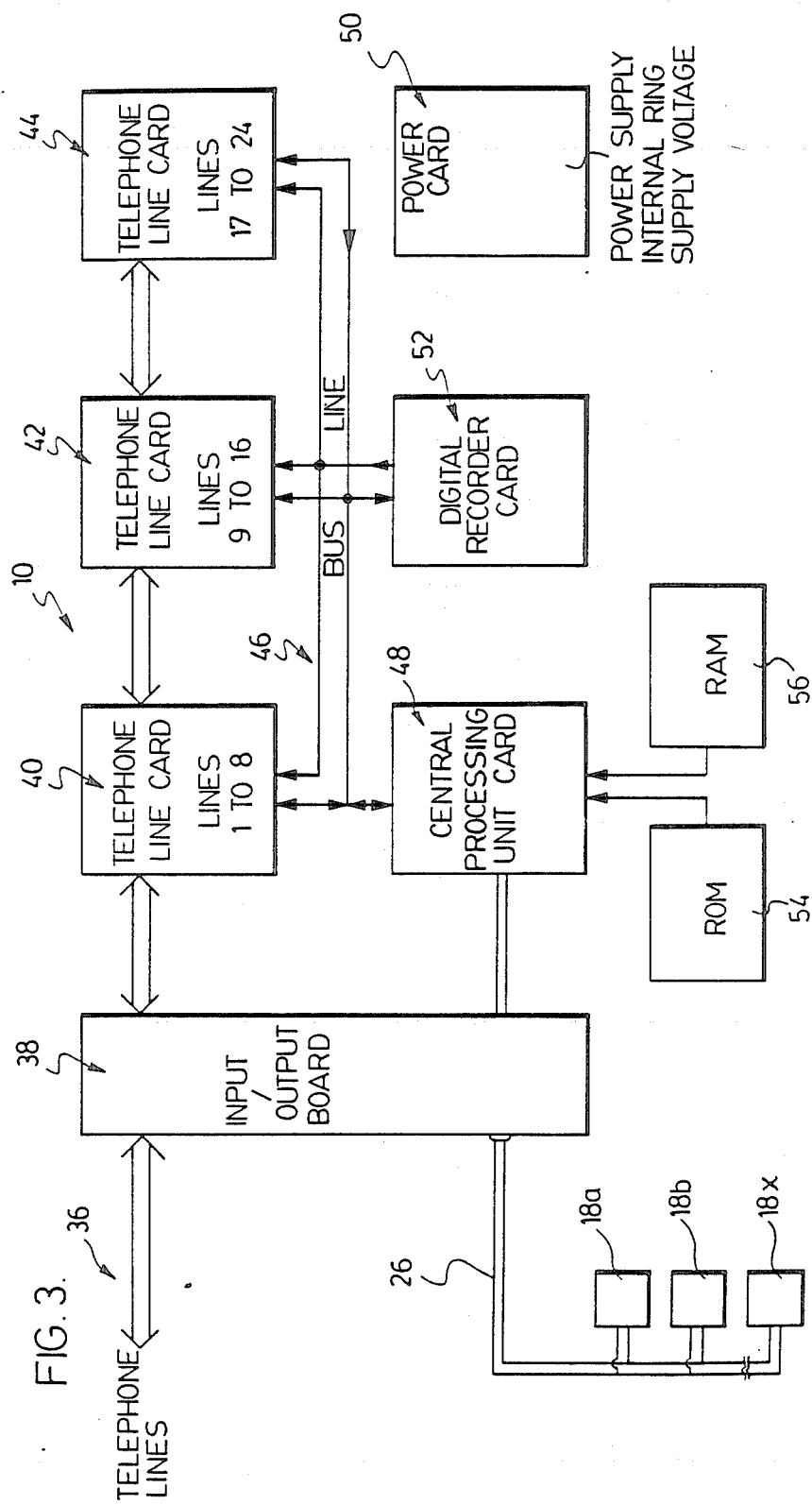
FIG. 3 is a block diagram of the interface of various interactive components of the call routing system.

The block diagram of FIG. 3 itemizes the essential components of the call routing system with agent monitoring facility and assigning facility. The system 10 is interfaced with the telephone lines 36 by way of an input/output board 38. The incoming twenty-four telephone lines are grouped into three sets, each set being handled by a separate line processing module. For sake of discussion, lines one to eight are processed by module 40; lines nine to sixteen by module 42; and lines seventeen through twenty-four by module 44. Via the bus line 46, the central processing unit (CPU) 48 communicates with the line modules 40, 42 and 44. All items are powered by module 50 which has a power supply and internal ring supply voltage for operating the telephones. The power supply system is electrically connected to the various units, including the digital recorder module 52 to supply power to same. The digital recorder module 52 is under the control of the central processing unit 48 to play various desired recorded messages on any one of the lines on which an incoming call has been placed on hold. The central processing unit 48 has two separate memory storages. A non-volatile read-only memory 54 includes program storage and system storage. A random access memory 56 is provided with various tables and stores traffic statistics gathered by the central processing unit in communicating with the telephone line card modules 40, 42 and 44. In accordance with the program contained in the read-only memory 54 and the information stored in the RAM 56, the central processing unit 48 assigns each incoming call to a particular agent display module 18a to 18x through the input/output board 38.

Figure 4:
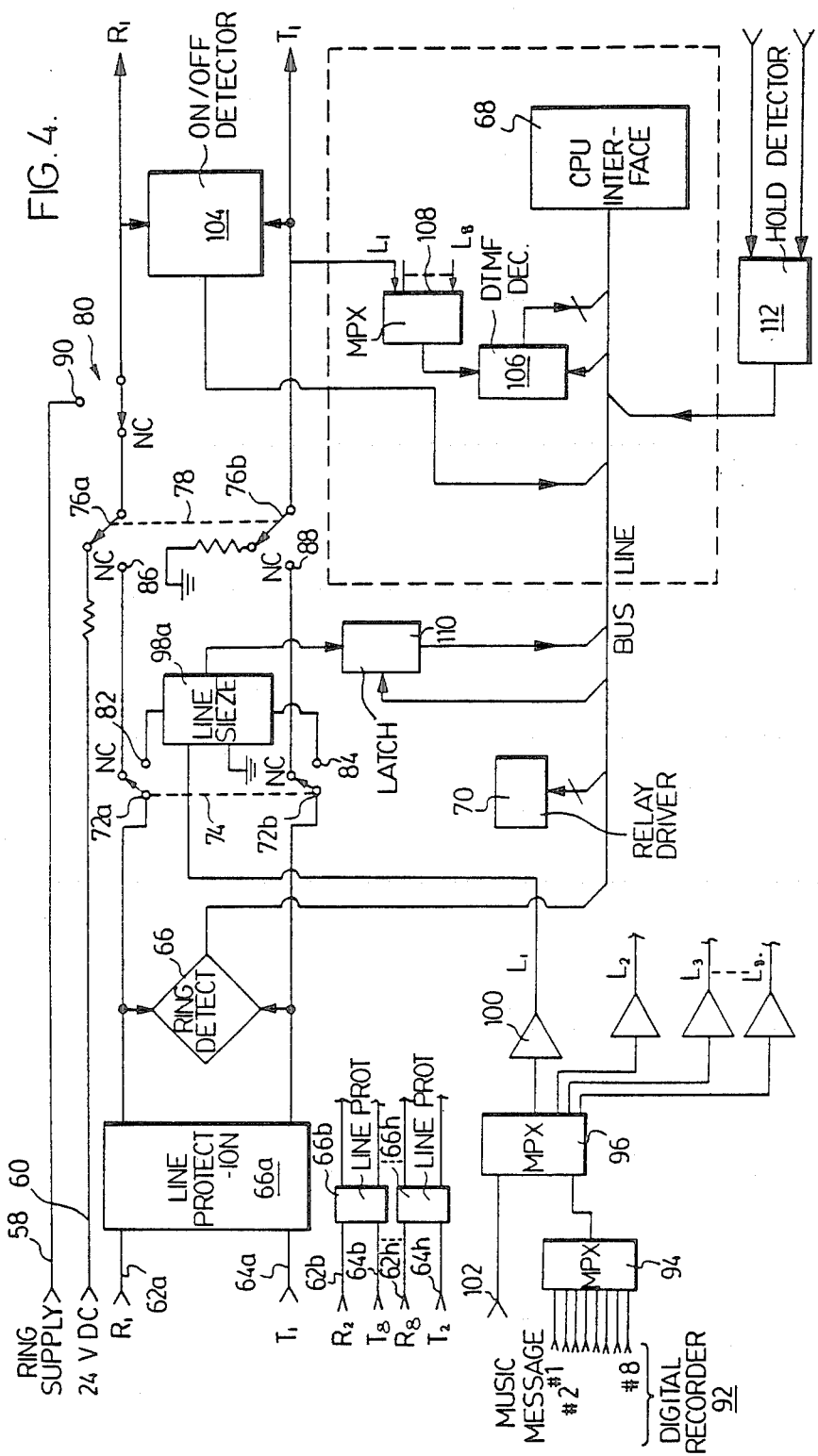
FIG. 4 is a schematic of a portion of the electrical circuitry associated with a line card for interfacing the call routing system to incoming telephone lines.

The circuitry components of each telephone line card are shown in more detail in FIG. 4. From the input/output board 38 are the ring supply line 58, twenty-four (24) volt DC line 60, the ring line 62 and the tip line 64. A line protection device 66 is provided in the ring and tip lines to prevent any over-voltages or current surges in the lines affecting the sensitive electronic components of the line card. Since eight lines feed into the line card, there are also ring and tip lines 62b and 64b down to 62h and 64h representing a total of eight incoming lines for this particular line card. An opto-isolator device 66 is used to detect an incoming call by detecting a ringing signal. The ring detect device 66 is connected to the bus line for communication with the central processing unit through the CPU interface 68. Each incoming line includes its own line protection device 66b through 66h and correspondingly its own ring detecting device, all of them communicating via bus line through the CPU interface with the central processing unit 48. When device 66 detects an incoming call and signals the central processing unit, depending upon information gathered from the RAM 56, the central processing unit assigns the incoming call to one of the agent positions via the corresponding agent display module. Interposed in the ring and tip lines and the ring supply and voltage lines are two sets of linked relay switches and a single relay switch. These relay switches are driven by corresponding relay drivers generally represented by block 70. The first set of solenoid switches in the normally closed position is 72a and 72b linked by arm 74. The second set is switch 76a and 76b linked by arm 78. The third switch is 80 in the normally closed position. Note that switch 76 is in the normally open position. With switch 72a and 72b in the normally closed position, the ring and tip lines are intercepted by switches 76a and 76b being open. However, 76a in the normally open position supplies a twenty-four volt DC voltage with switch 80 in the normally closed position through the ring line to the telephone which has a tone generating system to be discussed later with respect to the telephone operation. Once the ring detecting device 66 signals to the central processing unit that there is an incoming call, the central processing unit via the bus line drives the relay driver 70 to move switches 72a and 72b to the normally open position to make contact at points 82 and 84. Switches 76a and 76b are moved to the normally closed position at contacts 86 and 88. Switch 80 is moved to the normally open position to contact 90. This is the line seize and ring position for the switches which also enables the play back of messages on the incoming lines while the call is being held for answering by an agent position.

A message recordal device 92, which may be a digital recorder, has the facility to record up to eight different messages as programmed into the digital recorded under the control of the central processing unit via the bus lines, such connecting not being shown for sake of clarity. The message is fed through multiplexers 94 and 96 to the corresponding line seize device 98a, b, c or h through the corresponding amplifier 100 and line 1, 2, 3 or 8. With the switches 72a and 72b in the normally open positions, the message directed to the line seize device, for example, 98a is played back to the party having actuated the incoming call through the respective telephone line. Any number of messages up to possibly eight different messages may be played to the incoming caller. In between messages, music may be provided through multiplexer 96 at input 102.

An "on" hook and "off" hook detector 104 bridges ring and tip lines R1 and R2 to determine when one of the agents' telephones 20a through 20x has gone off hook to answer the incoming call on, in this instance, line 1. On detecting an "off" hook condition, the detector via the bus line and through the CPU interface, signals the central processing unit that one of the telephones has been connected to the particular ring line, in this instance, line 1. Such signal alerts the central processing unit that a coded signal is about to be transmitted by the telephone which has gone into the "off" hook condition and connected to line 1. The CPU then receives a coded signal indicating the agent position which has been actuated to answer the incoming call on line 1. The dual tone generation system, to be discussed with respect to FIG. 6, which provides the coded signal across lines R1 and T1 is detected by dual tone multi-frequency decoder 106. The signal is fed through multiplexer 108 through the corresponding line L1. It is appreciated that all eight lines are fed into this single multiplexer unit 108. The decoder 106 decodes the dual tone multi-frequency tone and communicates with the central processing unit along the bus line through CPU interface to provide a signal in decoded form which indicates the particular agent position which has been actuated to answer the incoming call on line 1. When this signal is confirmed in the central processing unit, the central processing unit in turn actuates the relay driver 70 to move switches 72a and 72b to the normally closed position while switches 76a, 76b and 80 remain in their prior positions, so that now the incoming line R1, T1 is transparent to the unit and is connected directly to the telephone which has been actuated on line 1. After the agent has completed the conversation with the caller, the agent hangs up and goes to an "on" hook position. Detector 104 detects when the agent's telephone has been disconnected from line 1 to send a signal which indicates an "on" hook condition, that is the agent has completed his call, such signal being fed through the CPU interface to the central processing unit. The central processing unit thereby actuates the relay driver 70 to return switch 76a and 76b to the normally opened position so that the switches 72, 76 and 80 are in a position to receive the next incoming call.

In communication with the line seize device 98a is a call abandon latch 110. The call abandon latch 110 signals the central processing unit through the interface 68 when an incoming call, for example on line 1, which has been sensed but not yet answered, is abandoned by the caller hanging up. In signaling the central processing unit, relay driver 70 is actuated to return the switches from the playback or message position to the position which is ready for receiving another call.

The telephone line card also includes a hold detector 112 which determines when a particular agent's telephone has placed an incoming call on "hold". The hold detector 112 communicates with the central processing unit through the interface 68. The central processing unit then directs the relay driver 70 to move the switches 72a and 72b to the normally open position which permits the playback of message or music as directed by the central processing unit through the line seize device 98a.

Figure 5A:
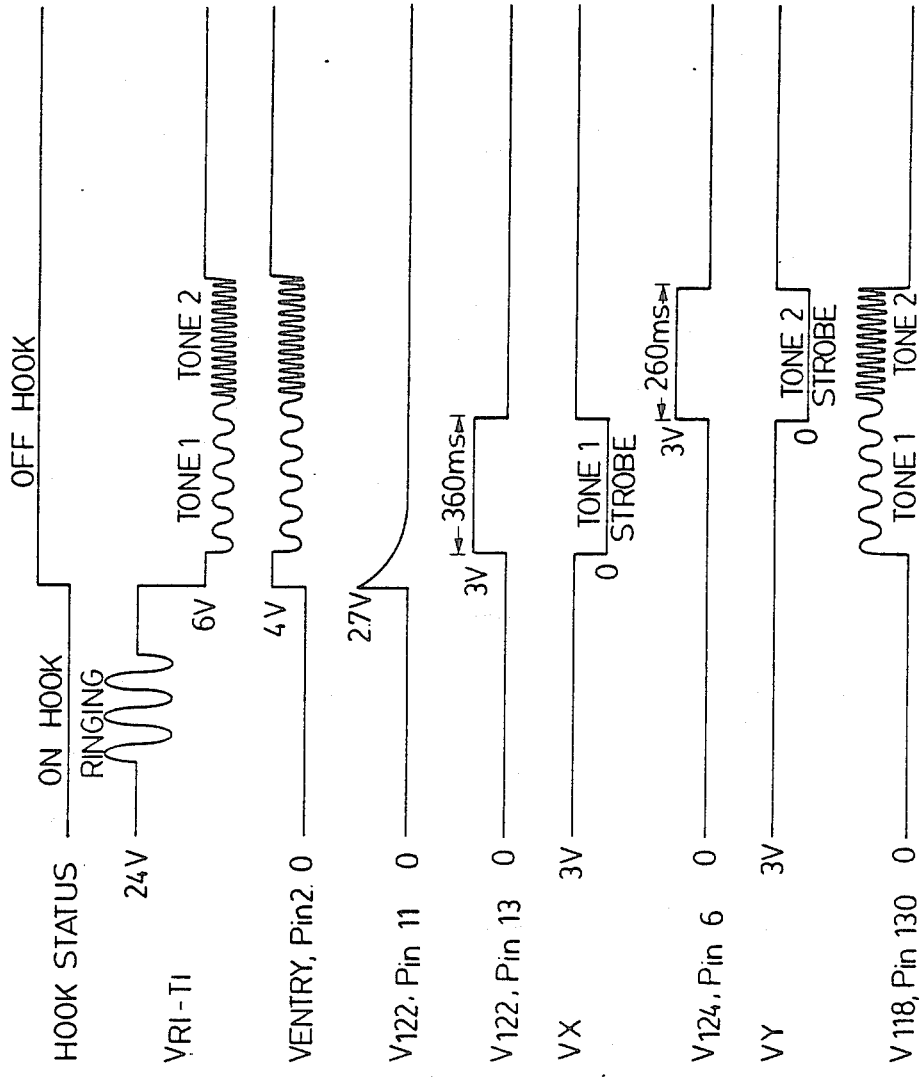
FIG. 5A is a timing diagram for the tone generation system of FIG. 5B.
Figure 5B:
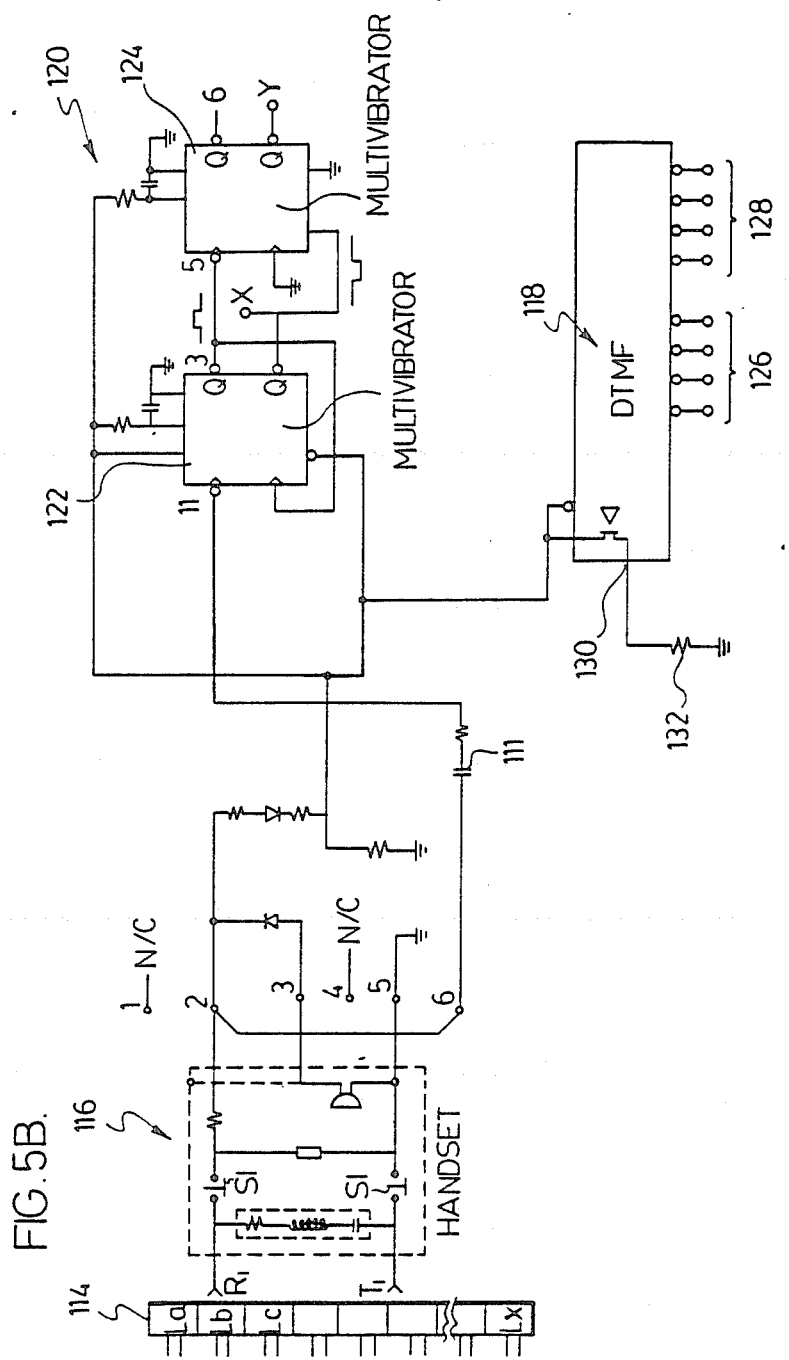
FIG. 5B is a schematic of a portion of electronic circuitry of an electro-mechanical telephone tone generation system.

With reference to FIG. 5B, the generation of the dual tone multi-frequency signal, when the telephone is actuated to answer an incoming line, is shown. Incoming lines La through Lx, namely twenty-four lines, are shown at interface 114. These are the same lines leading from the key telephone system 34 of FIG. 2 to the respective telephones. For purpose of illustration, a single line having ring line R1 and tip line T1 for telephone 116 shall be discussed and the manner in which the dual tone multi-frequency device 118 is actuated to send back via line 1 the coded signal to be detected by the decoder 106, when an "off" hook condition is sensed by detector 104.

With reference to FIGS. 5A and 5B, the operation of the tone generator for developing and transmitting a tone signal for detection by the main microprocessor is disclosed. During the idle state, that is with the telephone "on" hook, the potential difference between any two of the handset entry pins 1, 2, 3, 4, 5, or 6 is zero. When the telephone goes "off" hook to answer a desired incoming line, the switches S1 close, applying approximately a four volt direct current potential between pins 2 and 5. This supplies operating power for the tone generator 118. At the same time, a portion of the rising edge of this potential across the pins 2, 5 passes through capacitor 111 and appears at pin 11 of the multi-vibrator 122. The peak of this edge of the voltage across pins 2 and 5 then falls exponentially to zero. This fall in potential triggers the first multi-vibrator 122 of the system 120 whose output at pin 13 and identified as VU2 in FIG. 5A, goes high for a minimum of 360 milliseconds and then returns low. This returning to low triggers the second monostable multi-vibrator 124 of the system 120 at pin 5. The output of the system at pin 6 goes high for a minimum of 260 milliseconds and then returns to low as shown in FIG. 5A. Outputs at X and Y are complements, i.e. inverted correspondence to pins 13 and 6 of the multi-vibrators respectively. Point X, which is the output of multi-vibrator 122, is connected to one of the four row address inputs 126 and one of the four column address inputs 128. Similarly output Y of multi-vibrator 124 is connected to one of the three remaining selected row address inputs and one of the three remaining selected column address inputs 126 and 128. When the output at X is low or the output at Y is low, the selected tone pair composite as determined by the connections at 126 and 128 appears at the output 130 of the dual tone multiple frequency generator. As shown in FIG. 5A, when the output at pin VX is low, the first tone is generated at output 130 whereas when the output at VY is low, the second tone is generated 130. The resulting signal current through the resistor 132 appears as a component of the current through the ring and tip lines R1 and T1 at the handset. The signal voltage will, therefore, appear across the corresponding ring and tip lines R1 and T1 at the line card of FIG. 4 so that the signal is picked up by the decoder 106 in the manner discussed. Hence when the handset is lifted to close switches S1, the particular tone burst comprising two different tones as shown in FIG. 5A is transmitted back through the ring and tip lines to be detected by the signal decoder so that the central processing unit, through its software program, can gain information as to which agent position answered a particular incoming line as determined by the decoder in the line card.

Figure 5C:
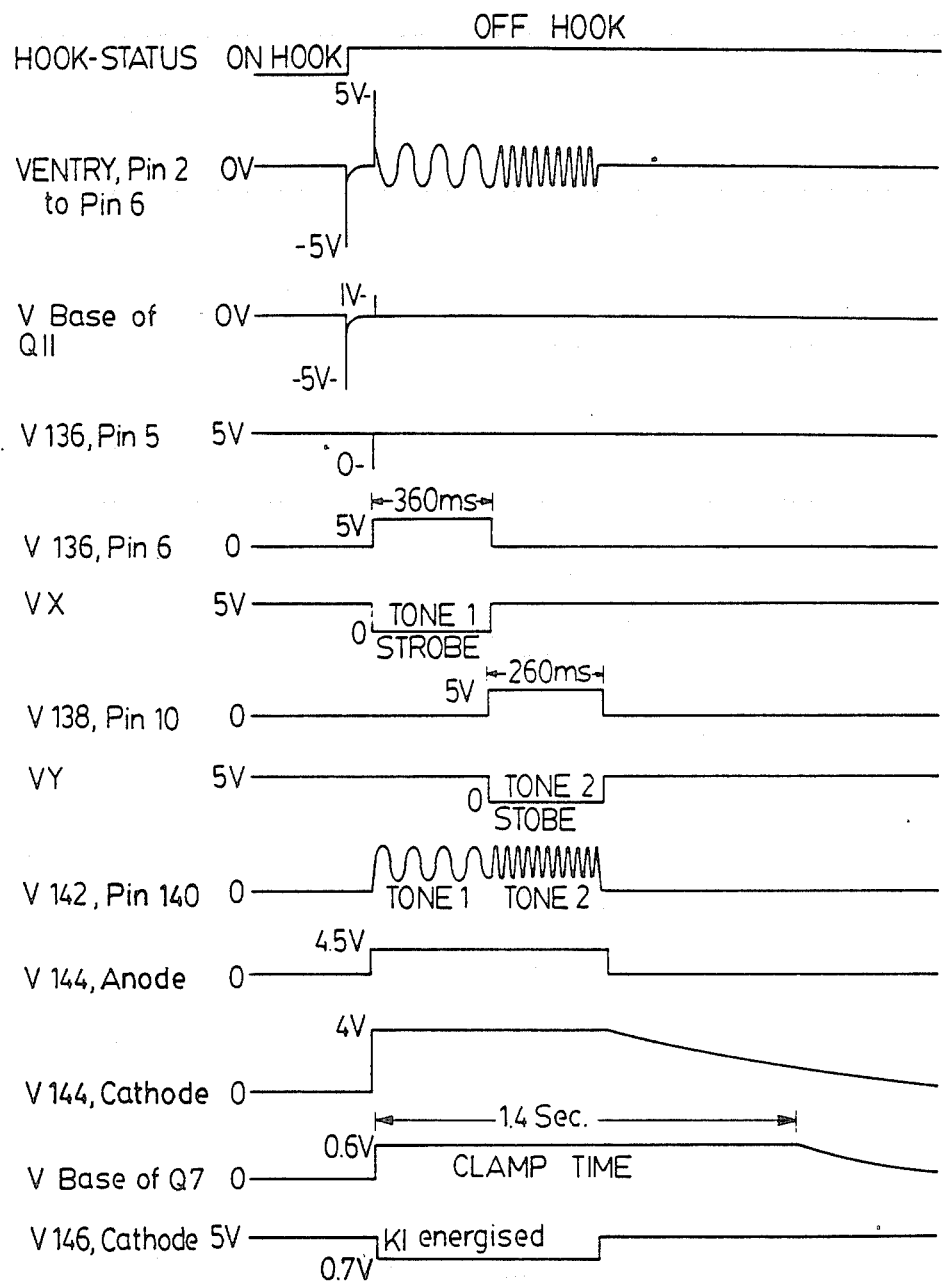
FIG. 5C is a timing diagram for the tone generation system of FIG. 5D.

The above tone generation system was discussed with respect to an electro-mechanical type telephone system. It is appreciated that the sending of a signal, when a telephone of an electronic key unit is picked up, may be accomplished by way of a somewhat more complicated electronic circuitry. With reference to FIGS. 5C and 5D, during the "on" hook state for the electronic key phone set 117, the potential difference between the entry pins 1 and 4 and between entry pins 3 and 4 may be anywhere from 14 volts to 50 volts DC. Entry pins 1 and 3 lead to two balanced 8 milliampere constant current sources 148. The constant current source is, in turn, connected to the multi-vibrator 136 and 138 and DTMF generator 142. A regulated operating voltage is, therefore, applied to the tone generator circuitry. When the telephone set 117 goes "off" hook, a spike appears between entry pins 2 and 6 which is induced in the secondary of transformer 134. The spike passes through capacitor, 135 to turn on momentarily transistor Q11 such that pin P5 of the multi-vibrator 136 is driven low triggering the monostable multi-vibrator 136. The output at pin P6 of the multi-vibrator 136 goes high for a minimum of 360 milliseconds and then returns low. This returning low, triggers the second multi-vibrator 138 at pin P11. Its output at pin P10 of multi-vibrator 138 goes high for a mimimum of 260 milliseconds and then returns low. As with the system of FIG. 5B, outputs X and Y are complements of pins P6 and P10 respectively of multi-vibrators 136 and 138. Pin X is normally connected to one of the four selected row address inputs 150 and to one of the four selected column address inputs 152. Pin Y is normally connected to one of the three remaining selected row address inputs and one of the three remaining selected column address inputs 150 and 152. When either the output at X or Y is low, the selected tone pair composite appears at the dual tone multi-frequency generator output at 140. This signal is buffered by transistor Q8 to allow greater signal current drive through the secondary of transformer 134. This signal current induces signal voltage on the primary of transformer 134 and appears across the ring and tip lines R1 and T1 connected to terminals 2 and 6. Hence both tones are transmitted in sequence on the R1 and T1 lines for detection by the DTMF detector 106 of main system line card.

With the electronic key telephone set system, there are additional considerations in avoiding extraneous triggering of the multi-vibrator units and steps to be taken in avoiding the tone burst being heard by the agent. During the time that multi-vibrator 136 or 138 has output at pins P6 or P10, transistor Q7 is biased on and remains biased on for about 800 milliseconds after pin P10 goes low, so that any spikes appearing in the system are clamped to ground at the collector of transistor Q7 to reject any spurious retriggering spikes. Transistor Q9 is turned on so as to energize the relay Q1 which disconnects the ring line of the telephone set from the key system and reconnects the ring line of the telephone set to the tip line of the key system to prevent the agent from hearing the tones transmitted through the lines during the brief interval of signal generation and transmission.

In order to provide for an overall monitoring of the activity of the agents' positions and the routing of the calls, it is important to provide for a display at the agent address module the next incoming call to be answered and also any line which the agent may put on hold to research a particular item. A general representation of the circuitry of the agent address module is shown in FIG. 6C.

As discussed with respect to FIG. 1, the agent displays are connected in parallel to the main unit by a four conductor cable. As shown in FIG. 6C, the four conductor cable consists of a ground 160, a 12 volt DC power line 162, a data line 164 and an acknowledgement line 166. These lines are all connected to a microprocessor 168 which runs a driver 170 for the LEDs 172, 174, 176 and 178 which are all in communication with the driver network 170. Also input to the microprocessor 168 is by way of a code input 180 via lines 182. The code input may be a DIP switch system which provides a unique code for each agent display module.

In operation the data line and acknowledgment line serve as one-way transmission highways for the data being fed to the microprocessor and indicating either a line which is to be answered or a line which has been put on hold. LEDs 172 and 174 indicate the line which is on "hold", whereas LEDs 176 and 178 indicated the incoming call which is to be answered. Each data transmission cycle transmitted from the central processor unit and indicating which lines are to be answered or which line is on hold, consists of a timed sixteen bit (numbered from zero to fifteeen) serial pulse string. Detection of the start bit (bit-0) received by the agent display module synchronizes its reception of the following bits of information with the corresponding fifteen bits transmitted from the main central processing unit. These fifteen bits are all read and then analyzed by the microprocessor 168. According to a preferred embodiment of this invention, the transmission data bit format is as follows:

| BIT | |
|---|---|
| 0 | Start Bit |
| 1 | Address field |
| 2 | |
| 3 | |
| 4 | |
| 5 | |
| 6 | Data Field* |
| 7 | |
| 8 | |
| 9 | |
| 10 | |
| 11 | Data Type* |
| 12 | Check Sum |
| 13 | |
| 14 | |
| 15 | |

To actuate an Agent-Display to indicate the next call to be answered, bit 11 (Data Type bit) must be 1 (high); bits 6 to 10 (Data Field bits) must be any number from 00000 to 11000 respectively to code for any one of up to twenty-four incoming call lines; and bits 1 to 5 (Address Field bits) are set to the binary equivalent of the agent module to be addressed.

To actuate an Agent-Display to indicate the line which is put on "hold", the information in the last paragraph is applied, except that bit 11 (Data Type bit) must be 0 (low).

The five DIP switch position on the agent module are used to set a particular agent address from zero to 23 in binary coded decimal in accordance with the settings for the DIP switches of the code input 180.

Figure 6A:
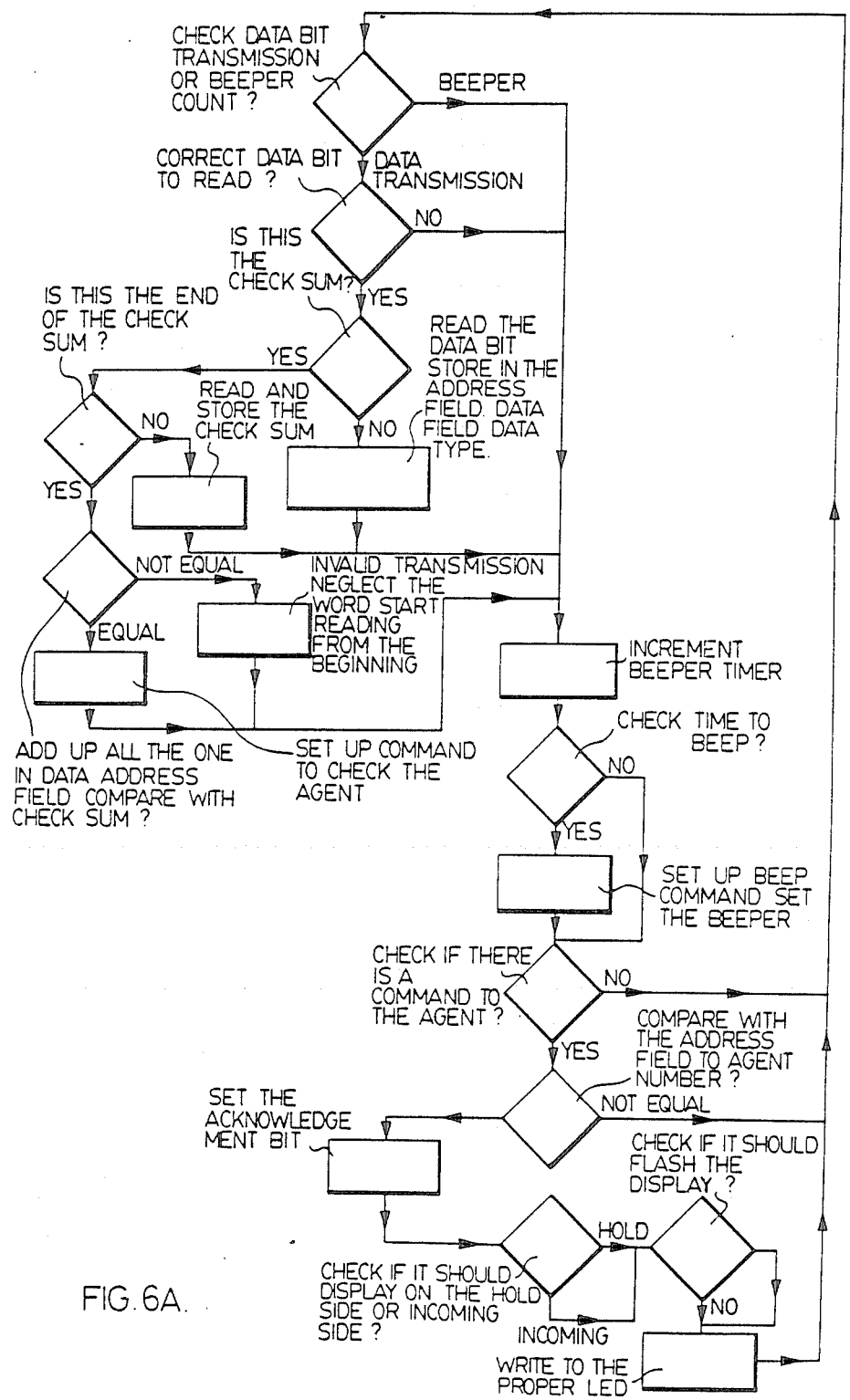
FIGS. 6A and 6B are flow charts for the program routines which control the operation of the agent's module, a schematic of which is shown in FIG. 6C.
Figure 6B:
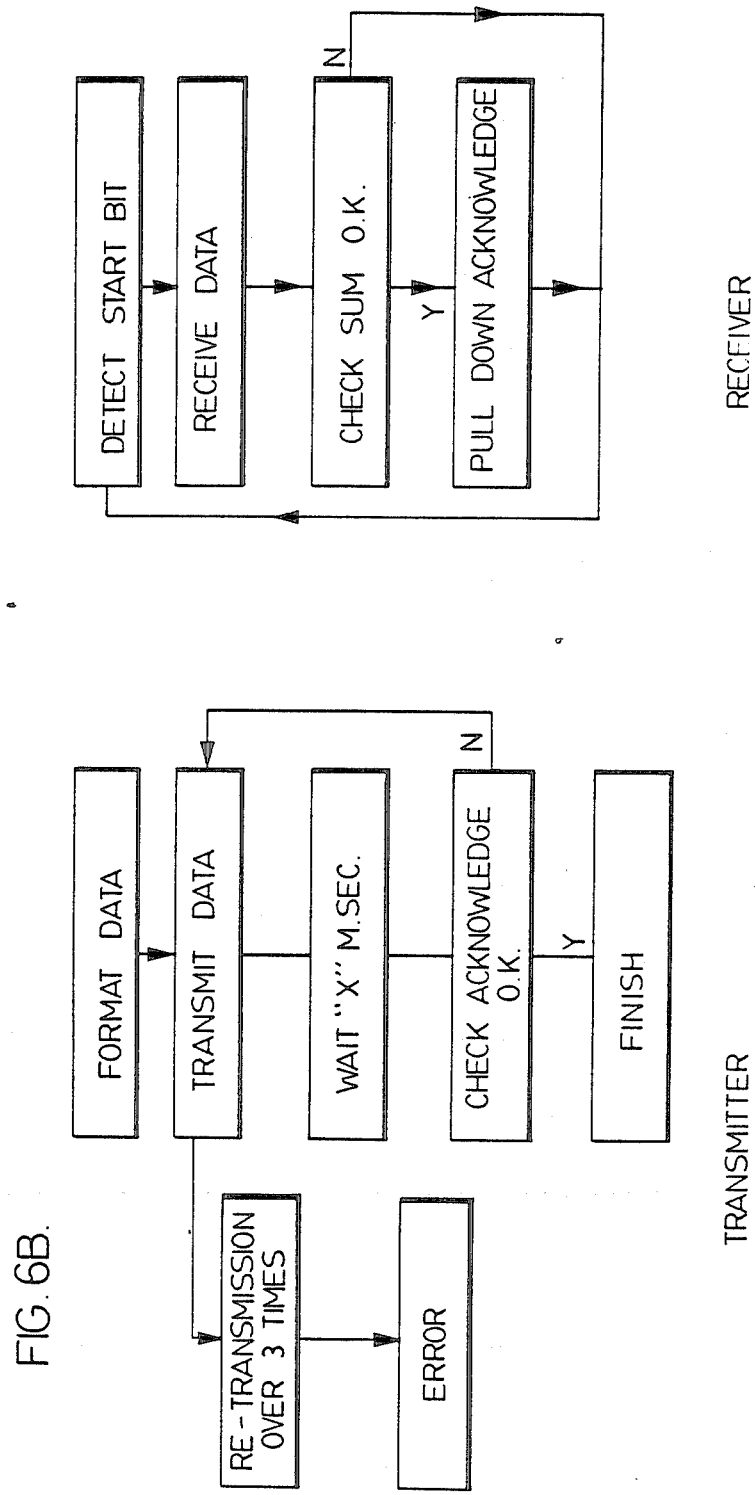

The microprocessor 168 includes the programs of flow chart FIG. 6A to provide a function description of the agent module decoding the received data from the central processing unit and displaying the data on the respective LED. A second flow chart FIG. 6B provides a functional description of the protocol of the transmitter of the main processing unit for transmitting data to the receiver of the agent module.

Figure 7A:
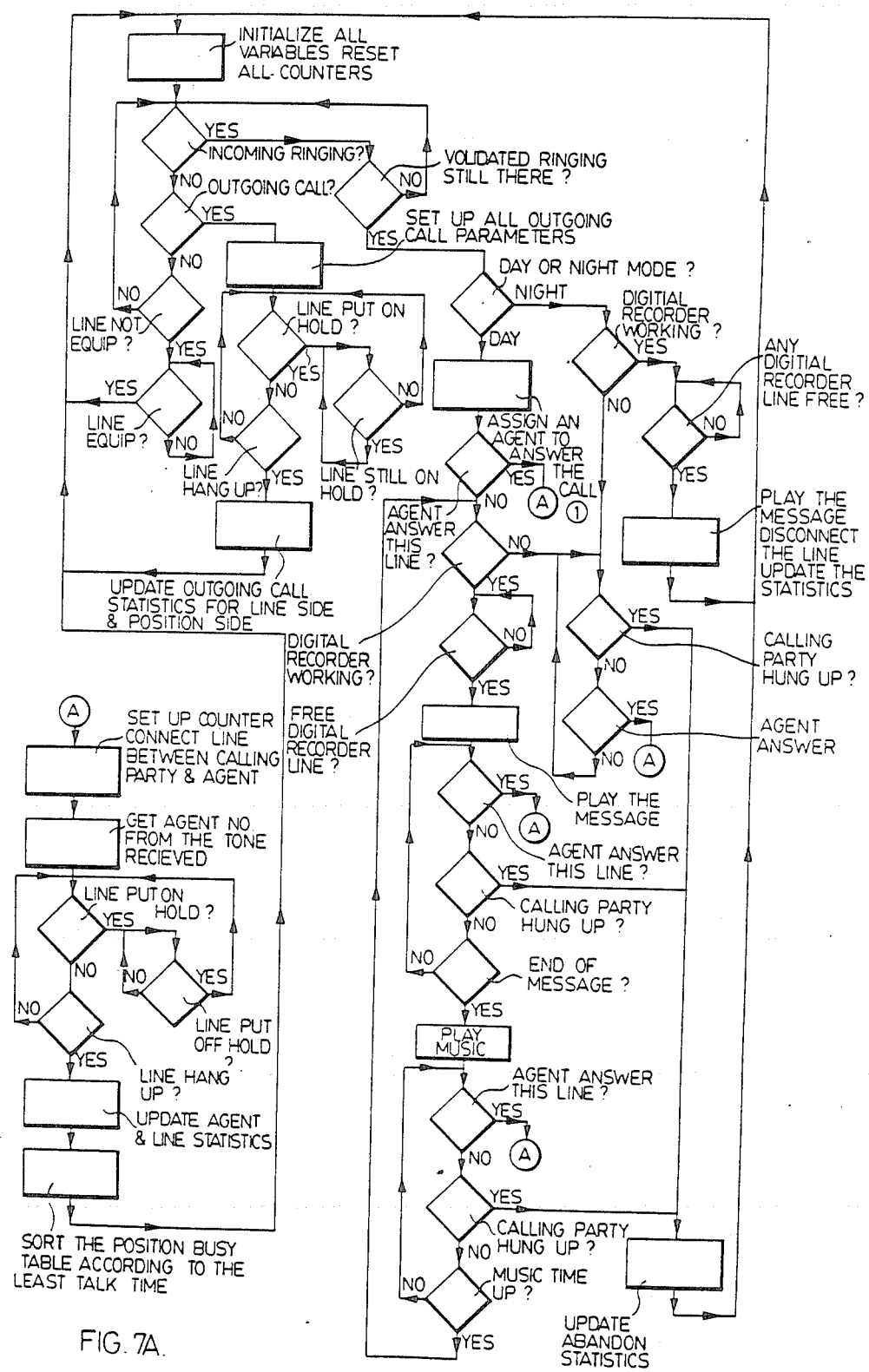
Figure 8:
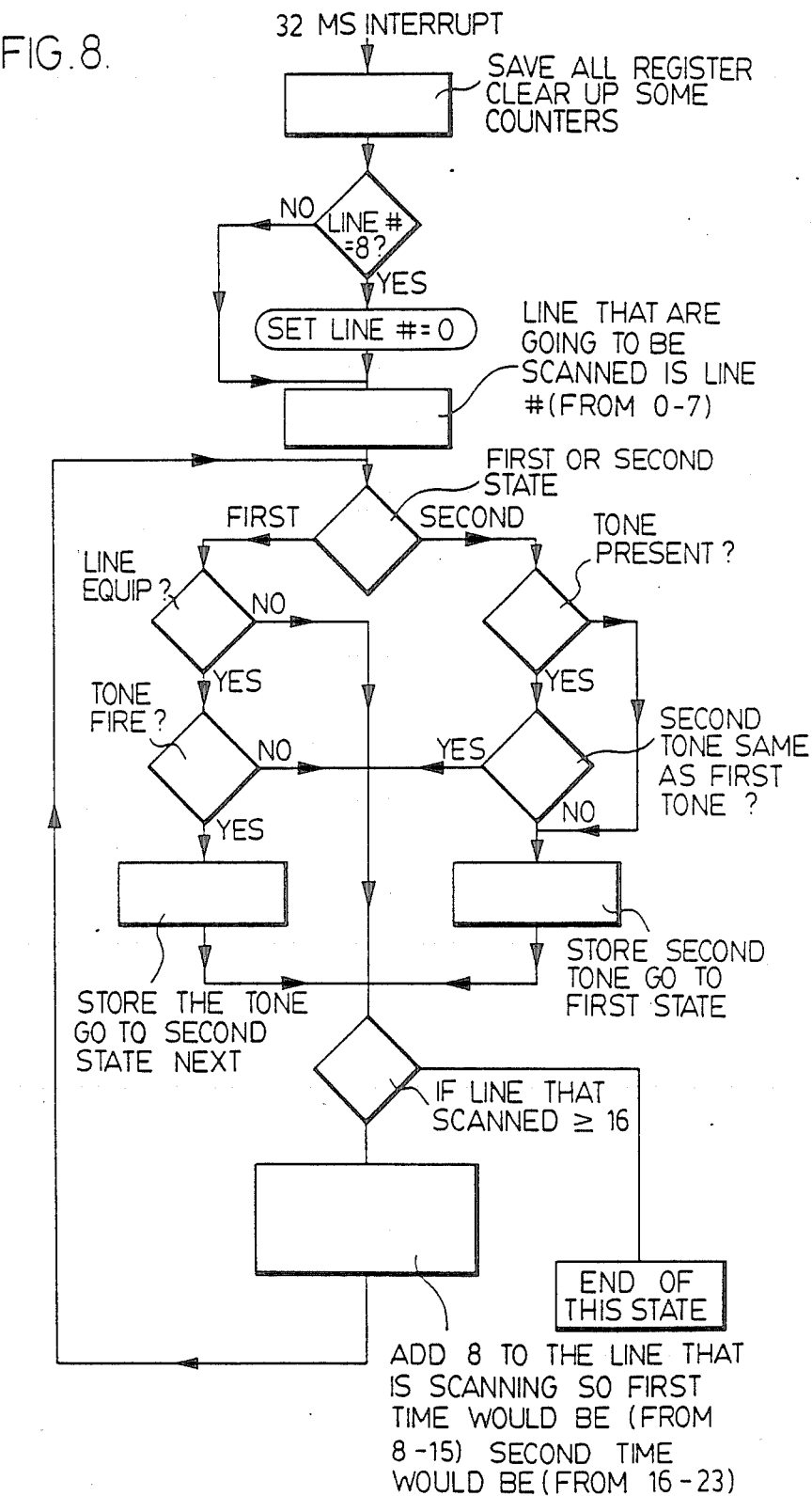
FIG. 8 is a flow chart for program routine which controls the detection of a coded signal emitted by an agent's module when a corresponding telephone answers an incoming call.
Figure 9:
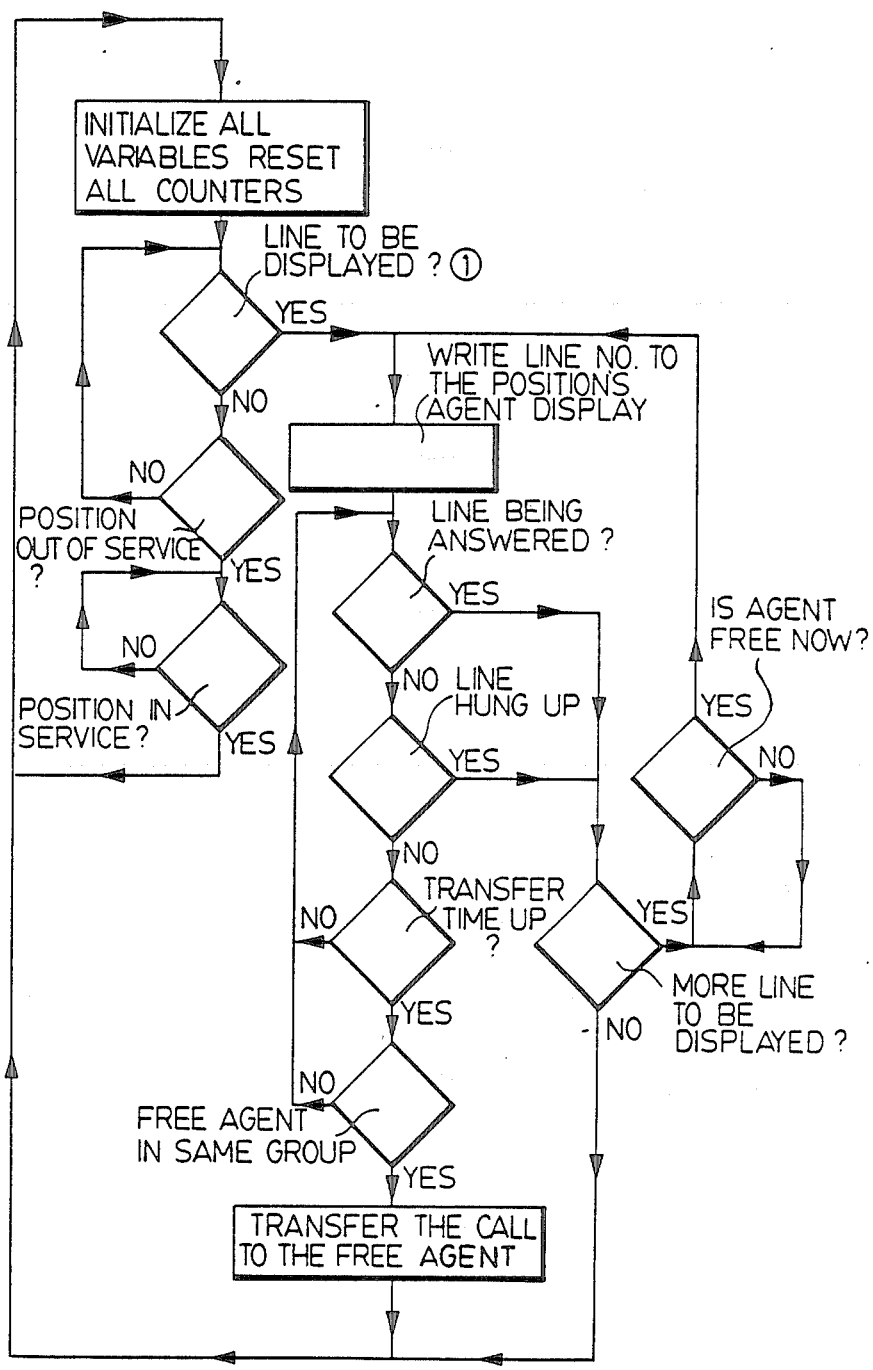
FIG. 9 is a flow chart for program routines which control routing of calls to a particular agent's module.

The central processing unit 48 of the block system shown in FIG. 3 performs all of the controlling functions based upon the program stored in the ROM 54 and the information it stores and retrieves from the RAM 56. It is appreciated that a number of programs are readily available to provide interaction of the central processing unit and the digital recorder for playing back messages, for setting times, for recording messages and playing them back, for entering data concerning service threshold and transfer threshold of the system, setting priority levels and group make-up. The particular logic employed for assigning of an incoming call line, detecting of tone transmitted by an agent position which has answered an incoming call and assignment and reassignment of incoming calls to agents have been set out in the logic diagrams 7A, 7B, 8 and 9. FIGS. 7A and 7B in combination define the logic for assigning an incoming call to an agent based on how busy a particular agent is and for controlling the incoming call insofar as playing messages while the party is on hold, playing of music, detecting when the call is completed and updating statistics in the random access memory. In the logic of assigning an incoming call to the least busiest agent, a "position busy table" is maintained in the random access memory. By way of the coded signal emitted from the agent's position when a called is answered, and in combination with the on/off detector 104, it is possible to time the period that each agent is busy on the telephone whether it is an incoming or outgoing telephone call. On the position busy table, the agent with the most amount of talk time is shifted to the bottom of the table where the agent with the least amount of talk time is shifted to the top of the table. Hence in the subroutine which selects the agent to answer the incoming call, the busy table is referred to and the agent at the top of the table is assigned that incoming call through the position system logic of the FIG. 9.

In the position system logic, there is a facility to switch from individual call assignment to group call assignment depending on how active the agents are and the number of incoming calls. If all agents are busy and there are one or more incoming calls on hold, then the first call on hold is assigned to the next agent who goes "on hook" without reference to the busy table to ensure that the calls are answered quickly during this particular peak period.

It is apparent from a review of the system logic that the many features of the invention can be provided. The particular feature of assigning an incoming call to the agent, which has the least talk time, is enabled by the use of a tone generator which transmits a coded signal through the line just answered by an agent's telephone. Hence when an agent position goes "off" hook on either an incoming call or an outgoing call, the tone generator will fire a tone burst on the line to which the agent position is now engaged. This tone, as processed by the main system, is used to identify which agent position is on which line, thereby making it possible to develop a position busy table which may be presented in binary decimal coded format and stored in the random access memory 56. The position busy table may have up to twenty-four agent positions where it is continuously sorted in accordance with the program to always have the range of the least busiest agent on the top and the most busiest agent on the bottom so that there is an equal sharing of the work load. As long as there is more than one free agent available, the system then automatically routes calls to an agent who has the least talk time. This is the "individual assignment mode". During the "individual assignment mode", calls are distributed automatically to a group of agents in such a way as to maintain a relatively even level of activity among that group of agents. This arrangement will increase moral and productivity of the agents, because they know that they are being treated fairly by the system.

The system, according to this invention, may be adapted during peak periods of the day when all agents are busy with calls, to switch automatically to the "group assignment mode" so that calls waiting in the queue are routed to the next available agent as soon as one becomes free regardless of accumulated talk time of any particular agent. During this peak period, the primary objective is getting all calls answered with little delay as possible. At any time when all agents are busy, the system automatically answers each incoming call and places it in a queue and in turn, actuates the first message telling the person calling that all agents are busy and please hold. In conjunction with this message, there may also be a commercial or some other description of the company or firm using the routing system. The digital recorder has a facility to record up to eight messages. Each line of the recorder can be programmed to announce three messages in any combination of the eight messages stored. The first two messages may be for day operation and the last one may be for night operation. With this approach, the system is provided which permits immediate playing of a message to an incoming caller without having to wait for the recorder to come to the beginning of the message or barging into the middle of the message.

As discussed, the system may be programmed to provide a service threshold which is a time parameter preset by the central operator to set the maximum length of time for a call to wait in a queue. Should this threshold time be breached, the agent display module, which has been assigned the incoming call, will emit an audible beep to prompt the agent that the call assigned to him or her has reached this service threshold period. The CPU may be programmed to record each time an agent is prompted to provide additional statistical information concerning the overall operation of the group at the end of the day. An additional time, which may be programmed into the system, is the transfer threshold. If this time is exceeded at any one agent position, the system will automatically transfer the call to a new agent position. The transfer threshold time may be set in accordance with company policy. This avoids holding a call to an unacceptable level particularly if an agent position is vacant. This system may also be programmed to match the system's answering characteristics with the organization specific clientele. This is accomplished by adjusting the number of rings allowed before the call routing system answers the call, varying the length of the messages and varying the length of the music interval between messages. The system may also be programmed to assign a priority level to incoming calls. For example, incoming calls on a Watts line or tie line may be assigned a higher priority than all other incoming calls and in turn, elevate them on the queue for assignment to either the next available agent or to the agent having the least amount of talk time. In addition, the ring delay on a Watts line incoming call may be delayed so that the line is not answered till late as possible to reduce thereby long distance telephone charges for the Watts line.

Although preferred embodiments of the invention have been described herein in detail, it will be understood by those skilled in the art that variations may be made thereto without departing from the spirit of the invention or the scope of the appended claims.

What is claimed is:

1. A telephone call routing system for routing incoming telephone calls by assigning each such incoming call to a selected one of a plurality of agent display modules, said system comprising means for receiving said incoming telephone call, means for assigning said incoming telephone call to one or more of said agent display modules, each of said agent display modules being in electronic communication with said incoming call assigning means, said agent display module having a visual output indicating which of a plurality of telephone lines carrying said incoming call is assigned thereto, a plurality of agents' telephones, each telephone being associated with a corresponding one of said agents' modules, means for connecting each of said telephones to said line carrying said incoming call, said telephone having means for generating and transmitting a coded signal along said telephone line carrying said incoming call when any one of said telephones is actuated to answer said incoming call, said signal being uniquely coded to identify said agent's module which is associated with said telephone which answers said incoming call, signal detection means to detect said transmitted coded signal and to decode said coded signal and determine which telephone associated with an agent's module answered said incoming call, means for monitoring agent telephone activity by determining and storing a characteristic representative of activity of each agent's telephone, means for accessing said monitor means and determining activity of each telephone answering incoming calls, said accessing means being in communication with said assigning means, said assigning means assigning the next incoming call to the selected agent's module associated with the least actively used telephone providing there are at least two inactive telephones at the time of assigning the next incoming call.

2. A telephone routing system of claim 1, wherein said assigning means includes means for determining if an answered incoming call is answered by said agents' telephone associated with said agents' module assigned said incoming call.

3. A telephone routing system of claim 2, wherein means is provided for determining frequency of any one of said agents' telephones answering said incoming call which said assigning means has assigned to one of said agent's modules not associated with said agent's telephone which answers said incoming call.

4. A telephone routing system of claim 1, wherein said characteristic of agent telephone activity being monitored is cumulative length of time any one of said agents' telephones is busy, said signal transmitting means transmitting said coded signal when said agent's telephone is actuated on a line, means for determining when said agent's telephone is deactuated from said line, said monitor means timing length of time said agent's telephone is actuated on said line, said storage means cumulatively storing said length of time to provide at any instance total length of busy time for each agent's telephone, said assigning means assigning the next incoming call to one of said agents' modules associated with said agent's telephone having least cumulative busy time.

5. A telephone routing system of claim 1, wherein said signal generating and transmitting means generates a tone burst which is coded to be unique for the particular agent's telephone being actuated.

6. A telephone routing system of claim 5, wherein said signal generating and transmitting means generates a dual tone signal, said signal detection means including a dual tone multifrequency decoder.

7. A telephone routing system of claim 1, wherein said assigning means has two modes for routing calls, said assigning means in said first mode assigning said incoming call to said agent's module which is associated with said telephone least frequently used, said assigning means changing automatically to said second mode when all but one of said agents' telephones are busy, said assigning means when in said second mode assigning an incoming call to each agent's module of a predetermined group of said plurality of agents' modules.

8. In a call routing system for routing incoming calls to a selected one of a plurality of agent positions, said system comprising a plurality of agents' display modules and associated agents' telephones, each agent position consisting of an agent's display module and associated agent's telephone, each of said telephones being connectable to any one a plurality of telephone lines, means for controlling routing of incoming calls, said controller means having means for assigning an incoming call to a selected one of said agent positions by displaying at a corresponding said agent's module an incoming call line to be answered, each of said agents' telephones comprising means for generating and transmitting on an answered incoming call line a coded signal unique to said agent's telephone which is actuated to answer said assigned incoming call line, said controller means having means for detecting and decoding said transmitted coded signal to determine which agent's telephone answered said assigned incoming call line.

9. In a call routing system of claim 8, said signal generating means generating a dual tone multiple frequency signal which is unique for each agent's telephone, means for programming each said signal generating means to transmit said unique dual tone signal identifying a particular said agent's telephone which has answered said assigned incoming call.

10. In a call routing system of claim 8, said controller means having means for measuring length of time each agent's telephone is actuated on any one of said telephone lines, memory storage means for cumulatively storing said measured lengths of times for each said agent's telephone, said assigning means having means for accessing said memory storage to determine said values for total busy times for all said agents' telephones, said assigning means assigning next incoming call to an agent's telephone having a least value for total busy time when there are at least two inactive telephones.

11. In a call routing system of claim 10, said length of time measuring means including means for detecting when said actuated agent's telephone is deactuated and means for timing the length of time from said detected coded signal to detected deactuation of said agent's telephone.

12. In a call routing system of claim 8, said agent's module having means for emitting an audible beep, said controlling means having means for actuating said audible beep emitting means when an assigned incoming call has not been answered within a predetermined first period of time of assignment.

13. In a call routing system of claim 12, said controlling means having means for reassigning to at least one other agent's position an incoming call when not answered at an assigned agent's position within a predetermined second period of time of assignment.

* * * * *